L. NEDOMANSKY.
PROCESS FOR THE MANUFACTURE OF STAMPS.
APPLICATION FILED OCT. 30, 1912.
1,077,740.                                              Patented Nov. 4, 1913.
Fig. 1
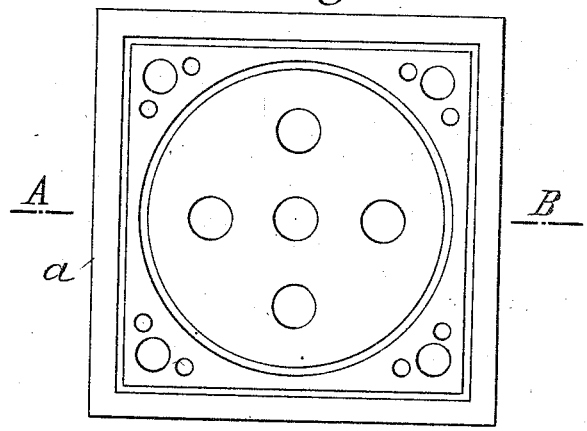
Fig. 2
Fig. 3
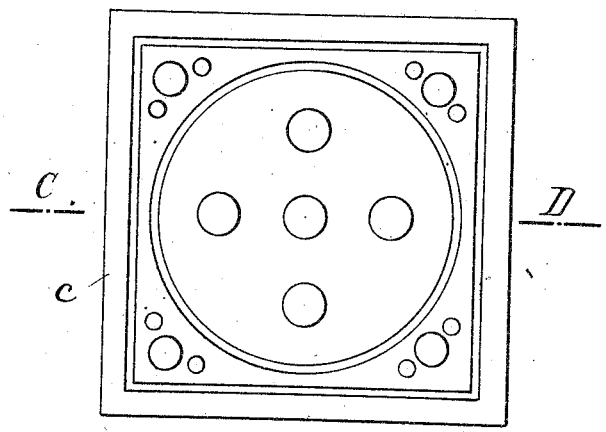
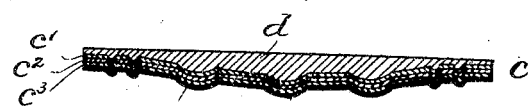
Fig. 4
Witnesses:
Elizabeth Meyer
Anna Hoyer.
Inventor:
Ludwig Nedomansky

UNITED STATES PATENT OFFICE.

LUDWIG NEDOMANSKY, OF VIENNA, AUSTRIA-HUNGARY.

PROCESS FOR THE MANUFACTURE OF STAMPS.

1,077,740.   Specification of Letters Patent.   Patented Nov. 4, 1913.

Application filed October 30, 1912. Serial No. 728,721.

*To all whom it may concern:*

Be it known that I, LUDWIG NEDOMANSKY, a subject of the Emperor of Austria-Hungary, residing at Vienna, Austria-Hungary, have invented certain new and useful Improvements in Processes for the Manufacture of Stamps, of which the following is a specification.

The stamps hitherto used for embossing metal sheets in high relief, consisting of engraved metal plates (dies and counter dies) are very expensive and difficult to make when large surfaces are to be embossed.

The present invention relates to a method of making quickly and cheaply stamps for this purpose of a material other than metal, whereby the cost of embossing is very considerably diminished, and the application of embossed plates is considerably extended, for instance to sheet metal tiles, furniture, panels, decoration of buildings or doorways, dadoes, tablets, metal name plates and many other decorative objects, particularly when they are of considerable size.

In the drawing, in which I have illustrated my invention, Figure 1 merely shows the matrix made according to my invention, Fig. 2 being a section therethrough along A—B in Fig. 1; Fig. 3 shows the die, Fig. 4 being a section therethrough along C—D in Fig. 3.

In carrying out my process I first make the matrix $a$, and for this purpose, I use a fiber as one of the most suitable substances. After the fiber has been engraved in the usual manner its surface is hardened by coating it first with a solution of bone-glue, and then with a mixture of shellac and glycerin in about the proportion of 1:4. There is thus produced a strongly adherent glazed surface $b$ on the fiber so that the matrix can be used for embossing metal sheets whether by hot or cold pressure.

In order to make the die, powdered alabaster, shellac, chalk, glycerin and bone glue are intimately mixed, and the mixture stirred with hot water to form a thick paste. Suitable proportions for this mixture are 5 parts by weight alabaster, 1 part shellac, 2 parts chalk, 1 part glycerin, 1 part bone-glue and 2 parts water; this paste is spread on a base to a suitable thickness and covered with a pliable paper, such as Chinese fiber paper, and pressed while still warm, with the corresponding matrix. The mold thus obtained is coated with an adhesive such as a mixture of bone glue and glycerin again covered with fiber paper and then pressed together with the matrix. As many paper layers are added as are necessary to give the necessary thickness and rigidity to the die which is finally coated with shellac and glycerin to give it a glazed surface $b^1$.

Figs. 3 and 4 show the die $c$ made up of three such layers $c^1$, $c^2$, $c^3$, the base being marked $d$ in Fig. 4.

The die is hard within two or three hours so that it can be used very soon after it has been made. The embossing in high relief is performed in exactly the same manner as when metal dies are used.

I do not wish to limit myself to the use of the materials above referred to and mentioned in the claims since similar materials may be used equally well for the same purpose and with the same result.

I claim—

1. A process for the manufacture of stamps for embossing metal sheets, consisting in first making the matrix of fiber, engraving it, and imparting to it a firmly adhering glazed surface coat, and then making the die by first preparing a paste of powdered alabaster, shellac, chalk, glycerin, bone-glue and water, then spreading the paste over a suitable base, covering it with fiber paper, pressing it with the matrix, again covering it with fiber paper, and again pressing it with the matrix, and repeating these operations until the desired thickness is obtained, and finally glazing the surface.

2. A process for the manufacture of stamps for embossing metal sheets, consisting in first making the matrix of fiber, engraving it, and coating it with a solution of bone glue, and then with a mixture of shellac and glycerin, and then making the die by first preparing a paste of powdered alabaster, shellac, chalk, glycerin, bone-glue and water, then spreading the paste over a suitable base and covering it with a pliable paper, pressing it with the matrix, again covering it with a pliable paper, again pressing it with the matrix, and repeating these operations until the desired thickness is obtained, and finally coating it with an adhesive and shellac and glycerin.

3. A process for the manufacture of stamps for embossing metal sheets, consisting in first making the matrix of fiber, engraving it, and coating it with a solution of bone-glue and a mixture of shellac and glycerin, and then making the die by first preparing a paste of 5 parts by weight of alabaster, 1 part shellac, 2 parts chalk, 1 part glycerin, 1 part bone-glue, and 2 parts water, then spreading the paste over a suitable base and covering it with Chinese fiber paper, pressing it with the matrix, again covering it with Chinese fiber paper, again pressing it with the matrix, and repeating these operations until the desired thickness is obtained, and finally glazing the surface to render it hard.

In testimony whereof I have hereunto set my hand in presence of two subscribing witnesses.

LUDWIG NEDOMANSKY.

Witnesses:
 JOSEF RUBRARCH,
 AUGUST FUGGER.